(12) United States Patent
Higgins et al.

(10) Patent No.: US 8,804,538 B1
(45) Date of Patent: Aug. 12, 2014

(54) ETHERNET Y-CABLES AND Y-SWITCHES

(75) Inventors: Chris Higgins, Sammamish, WA (US);
Edward L. Wallace, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 211 days.

(21) Appl. No.: 13/169,468

(22) Filed: Jun. 27, 2011

(51) Int. Cl.
*H04J 3/14* (2006.01)
*H04L 12/26* (2006.01)

(52) U.S. Cl.
CPC .. *H04J 3/14* (2013.01); *H04L 43/50* (2013.01)
USPC .......................................... 370/242; 315/294

(58) Field of Classification Search
CPC ........................................................ H04J 3/14
USPC ................................... 370/242, 220; 315/294
See application file for complete search history.

(56) References Cited

U.S. PATENT DOCUMENTS

| | | | |
|---|---|---|---|
| 6,027,347 | A | 2/2000 | Reichle |
| 6,116,958 | A | 9/2000 | Reichle |
| 7,318,551 | B1 * | 1/2008 | Mills |
| 2004/0153701 | A1 * | 8/2004 | Pickell ............................. 714/4 |
| 2006/0077891 | A1 * | 4/2006 | Smith et al. |
| 2006/0258211 | A1 | 11/2006 | Johnsen et al. |
| 2008/0290814 | A1 * | 11/2008 | Leong et al. |

OTHER PUBLICATIONS

"How to Make Your Own Ethernet Splitter", downloaded May 6, 2011 from http://www.instructables.com/id/How-to-make-your-own-Ethernet-%22splitter%22/, 6 pp.
"Ethernet "Y" Splitter" downloaded May 6, 2011 from http://forums.macnn.com/92/networking/277704/ethernet-y-splitter/, 3 pp.
"Provantage", downloaded May 6, 2011 from http://www.proavantage.com/d-link-systems-dem-cbcx300~7DLN900F.htm , 2 pp.
Amazon.com, "New Hummingbird AS SW Y Ethernet Y Cable for Speed Temp Sensor", downloaded May 6, 2011 from http://www.amazon.com/Humminbird-Ethernet-Cable-Speed-Sensor/dp/B004UOKCTQ , 4pp.
"How to Make Your Own Ethernet Splitter" downloaded May 6, 2011 from http://www.instructables.com/id/How-to-make-your-own-Ethernet=%22splitter$22/step4/M, 3 pp.

* cited by examiner

*Primary Examiner* — Wei Zhao
(74) *Attorney, Agent, or Firm* — Thomas | Horstemeyer, LLP

(57) ABSTRACT

Ethernet Y-cables are provided that include first, second and third Ethernet cable segments, each of which has a first end and a second end and at least eight insulated conductors. These cables further include a housing that receives the respective first ends of the first, second and third Ethernet cable segments and a switching mechanism that is disposed at least partly in the housing. The switching mechanism is configured to selectively connect the at least eight conductors of the first Ethernet cable segment to respective ones of either the at least eight conductors of the second Ethernet cable segment or the at least eight conductors of the third Ethernet cable segment. Related Ethernet Y-switches and methods of using the Ethernet Y-cables and Y-switches are also provided.

21 Claims, 7 Drawing Sheets

ETHERNET Y-CABLES AND Y-SWITCHES

BACKGROUND

Communications networks are commonly used to enable end devices such as computers, servers, memory devices and the like to communicate with each other and/or to communicate with remote devices via one or more external telecommunications links. These networks include, among other things, communications cabling and connectors (also referred to herein as "connector ports") that are used to interconnect the end devices, as well as network switches and routers that are used to route communications between the end devices. The end devices typically include a connector port such as, for example, an RJ-45 jack. The end device may be connected to the network by plugging a "patch cord" (i.e., a communications cable that has a connector such as an RJ-45 plug terminated on at least one end thereof) into this connector port, and then connecting the far end of the patch cord, either directly, or via additional communications cables, connectors and/or routers, to a connector port on a network switch. The network switch routes data signals that are transmitted from the end device toward their intended destinations (e.g., to other end devices, an external network, etc.), and likewise routes incoming data signals to the end device, as appropriate.

In many networks, each communications cable in the network includes eight insulated conductors such as copper wires that are arranged as four pairs of conductors, where the two conductors of each pair are tightly twisted together. Such cables are commonly referred to as "Ethernet" cables. Differential signaling techniques may be used to transmit a single information signal over each pair of conductors (referred to herein as a "differential pair" or simply as a "pair") in an Ethernet cable. With differential signalling, the signals transmitted on each conductor of the differential pair have equal magnitudes, but opposite phases, and the information signal is embedded as the voltage difference between the signals carried on the two conductors of the pair.

In many applications, it may be important that both the length and duration of any failures in the communications network be minimized. For example, commercial data centers are now commonly used by online retailers, Internet portals, search engine companies and the like to provide large numbers of users simultaneous, secure, high-speed, fail-safe access to their web sites and/or to run the computer-based applications that handle the core electronic business and operational data of those organizations. These data centers may host hundreds, thousands or even tens of thousands of servers, memory storage systems and other associated equipment that are interconnected via a communications network. Prolonged or even short failures in these communications networks can have drastic consequences for an organization in terms of lost sales, decreased productivity and the like.

DETAILED DESCRIPTION

Figure 1:
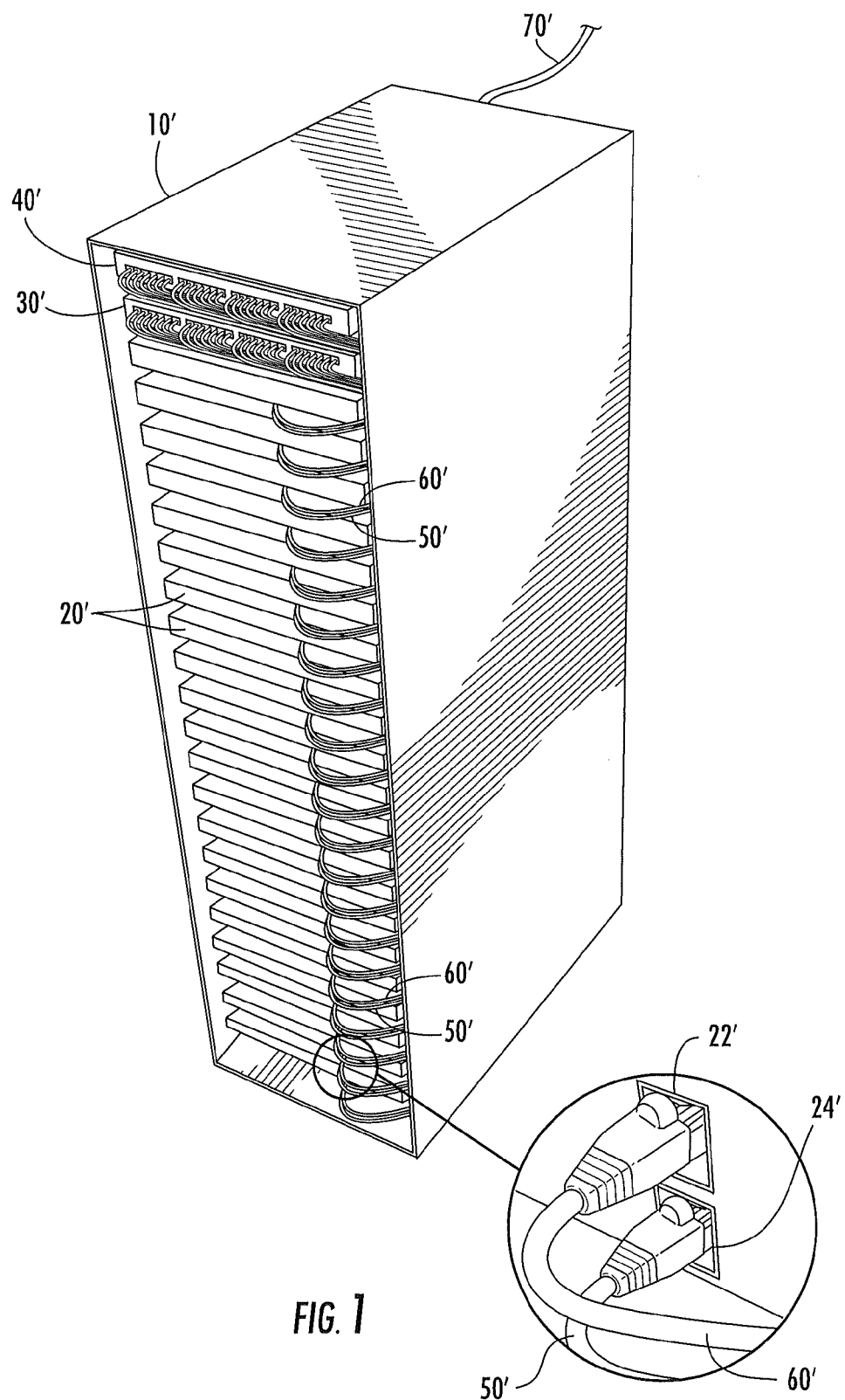
FIG. 1 is a perspective view of an equipment cabinet that illustrates how a plurality of host devices may be connected to a communications network through first and second network switches.

Switched Ethernet Y-cables are disclosed herein that may be used, for example, to connect a host device such as a server or memory storage device to connector ports on two different network switches. The Ethernet Y-cables according to embodiments of the present disclosure include a switching mechanism that may be used to selectively connect a first segment of the Ethernet Y-cable to either a second segment of the Ethernet Y-cable or to a third segment of the Ethernet Y-cable. In some embodiments, each of the first through third cable segments of the Ethernet Y-cable may include eight insulated conductors that are arranged as four differential pairs of insulated conductors, and the switching mechanism may comprise eight three-terminal, two-position switches. Each of these switches may be configured to selectively connect one of the insulated conductive wires in the first cable segment to a corresponding insulated conductor in either the second cable segment or the third cable segment.

In some embodiments, the Ethernet Y-cable may be configured to automatically sense a loss of the communications link between the host device and the active network switch that runs through, for example, the second cable segment. In response to sensing such a failure on the communications path through the second cable segment, the Ethernet Y-cables according to certain embodiments of the present invention may automatically flip each of the above-mentioned three-terminal, two-position switches so as to break the electrical connections between the insulated conductors of the first cable segment and the insulated conductors of the second cable segment and to connect each of the insulated conductors of the first cable segment to its corresponding insulated conductor in the third cable segment. Thus, the Ethernet Y-cables according to some embodiments of the present disclosure may automatically sense a failure in a communications path between a host device and a first network switch and then automatically reconfigure themselves to connect the host device to a second network switch in order to re-establish the communications link between the host device and the communications network.

Pursuant to further embodiments of the present disclosure, Ethernet Y-switches are provided that may be used instead of the above-described Y-cables to, for example, automatically switch a host device from a first network switch to a second network switch. In some embodiments, these Y-switches may be implemented in modular connectors that may be plugged into a connector port on the host device. These modular connectors include two RJ-45 style jacks as first and second output ports, which may be connected by patch cords to connector ports on first and second network switches. These Ethernet Y-switches may operate in the same fashion as the above-described Ethernet Y-cables in order to automatically switch a host device from connecting to a communications network through a first network switch to connecting through a second network switch in the event of a failure at the first network switch. In still other embodiments, a plurality of host devices may be connected to a single rack or cabinet-mounted switching unit that may be used to selectively connect each host device on the equipment rack to one of two network switches. With each of the above-described Ethernet Y-cables and Y-switches, the Y-cable/switch may automatically sense the communication link failure and activate its switches in response thereto or, alternatively, may activate the switches in response to a control signal received from another device that sensed the link failure.

There are numerous applications where an Ethernet cable (which is typically an Ethernet patch cord) that runs from a host device (e.g., a server) to a connector port on a network switch creates a single point of failure. For example, commercial data centers commonly include equipment cabinets and/or racks having a large number (e.g., twenty four) of host devices such as servers, memory storage devices, load balancers and the like that are each connected to a respective one of a set of connector ports on a network switch which serves as a gateway for each of these host devices to the communications network. The network switch is often mounted above the host devices on the same equipment rack or cabinet, and is commonly referred to as a "top-of-rack" network switch. Each connector port on the network switch may represent a single point of failure for the host device that connects to the network therethrough because if the connector port fails (or if the entire network switch fails), then the host device that is connected through the connector port loses connectivity to the network. When such a failure occurs, it may take an extended time period for the failure to be identified and then for a technician to be summoned, to locate the defective connector port or switch, to confirm that the connector port/switch has indeed failed, and to route the host device at issue through another connector port/switch. In many applications, the disconnection of the host device from the network (or the disconnection of a large group of host devices, which will occur with a failure of an entire network switch) may be costly or even catastrophic, as might be the case where the network switch failure disconnects servers or other host devices that are critical to the operation of a financial institution, online service provider or numerous other commercial or government entities.

In order to prevent and/or minimize the impact of such failures, at least some equipment cabinets/racks in commercial data centers may have two top-of-rack network switches mounted thereon, and some or all of the host devices may include two connector ports. The first connector port on the host device is connected to the first top-of-rack network switch and the second connector port on the host device is connected to the second top-of-rack network switch to provide a backup communications path from the host device to the network. FIG. 1 is a perspective view of an equipment cabinet that illustrates how a plurality of host devices may be connected to a communications network through first and second top-of-rack network switches in such a fashion.

As shown in FIG. 1, an equipment cabinet 10' includes a plurality of host devices 20' mounted thereon. In addition, primary and secondary network switches 30', 40' are mounted at the top of the equipment cabinet 10'. In the depicted example, the host devices 20' are servers. Each of the servers 20' include both a primary RJ-45 style connector port 22' and a secondary RJ-45 connector port 24'. Each of the network switches 30', 40' includes a total of twenty-four RJ-45 style connector ports. A first plurality of RJ-45 patch cords 50' are provided that are used to connect the primary connector port 22' on each host device 20' to a respective one of the connector ports on network switch 30'. Each of the patch cords 50' may comprise an Ethernet cable that has an RJ-45 plug terminated on each end thereof. Herein, the term "Ethernet cable" refers to a communications cable that includes at least two twisted pairs of insulated conductors that are suitable for use as a transmission medium for computer communications. While Ethernet cables are available that only include two twisted pairs of insulated conductors, it will be appreciated that today most Ethernet cables include four twisted pairs of insulated conductors. A second plurality of RJ-45 patch cords 60' are provided that are used to connect the secondary connector port 24' on each host device 20' to a respective one of the connector ports on network switch 40'. Cables 70' (only one cable 70' is illustrated to simplify the drawing) connect the network switches 30', 40' to other network devices such as, for example, network routers (not shown).

As noted above, it is not uncommon for a network switch such as network switch 30' or 40' to fail, particularly as these network switches 30', 40' are run 24-hours a day, seven days a week, for months or years at a time. Individual connector ports on a network switch such as network switch 30' or 40' may also fail, typically due to a software malfunction. In anticipation that such failures may occur, as noted above, the host devices 20' may have both primary and secondary connector ports 22', 24'. If the host device 20' senses a link failure on its primary connector port 22', the host device 20' may automatically switch to direct all data traffic to the secondary connector port 24' and to receive data traffic over the secondary connector port 24'.

While the system illustrated in FIG. 1 may provide a method for handling network switch failures with at most brief outages, the system requires that the data center use host devices that include two connector ports and that have automatic switchover capabilities. However, some host devices do not have dual connector ports and/or do not have automatic switchover capabilities, and other host devices that include these features may cost significantly more than comparable devices that do not include these features. In addition, the network design of FIG. 1 requires that two patch cords be provided for each host device, which results in increased cabling costs. The provision of two patch cords per host device likewise complicates cable management at the equipment cabinet/rack, which may already be a significant problem given space limitations and the large number of patch cords and/or cables that are typically routed to, from or within each equipment cabinet/rack.

Figure 2:
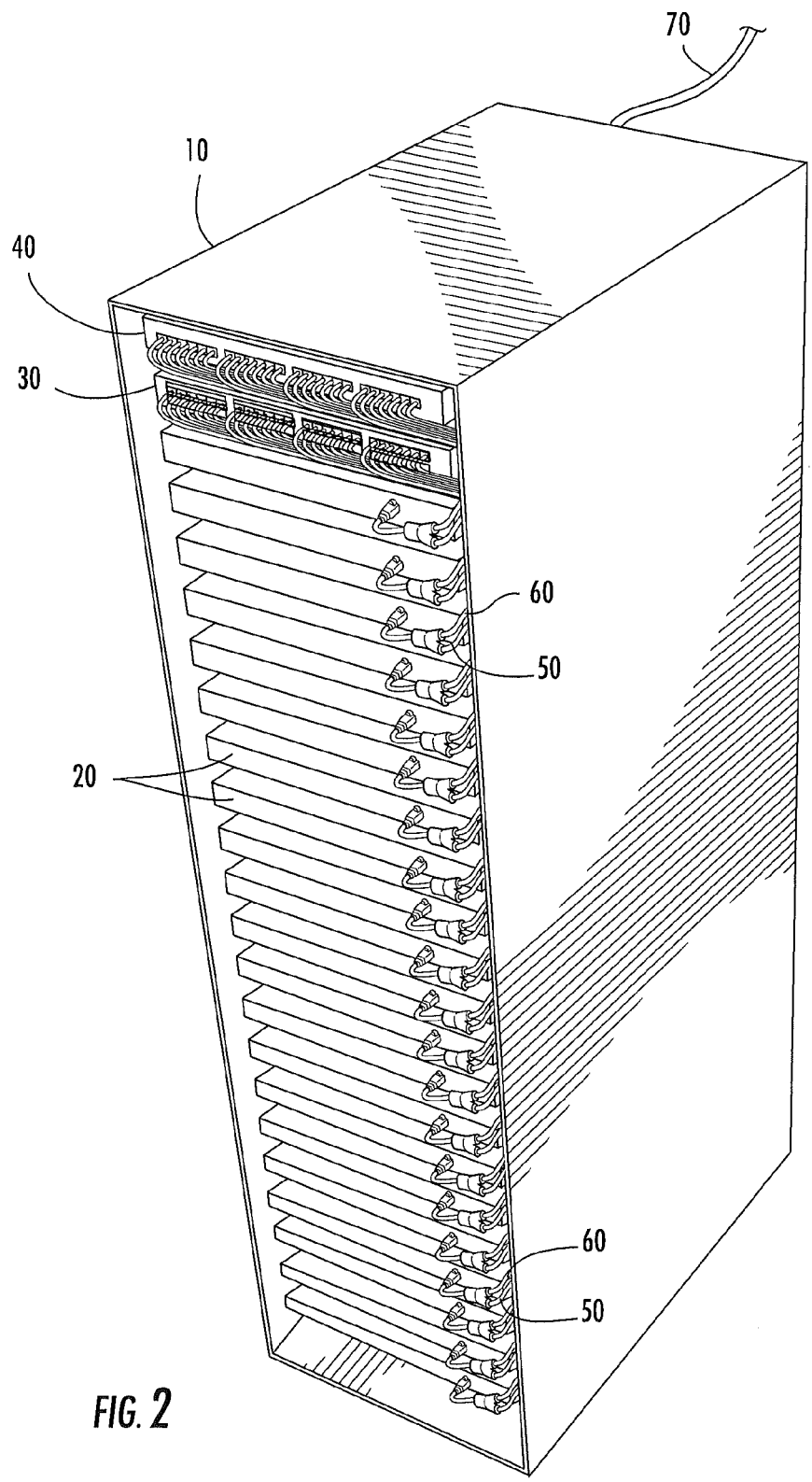
FIG. 2 is a perspective view of an equipment cabinet that illustrates how Ethernet Y-cables according to embodiments of the present disclosure may be used to connect a plurality of host devices that are mounted thereon to a communications network through either of a primary network switch or a secondary network switch.

As noted above, pursuant to certain embodiments of the present disclosure, Ethernet Y-cables are provided that may be used to connect each host device that is mounted in/on an equipment cabinet or rack to both a connector port on a primary network switch and to a connector port on a secondary network switch. FIG. 2 is a perspective view of an equipment cabinet that illustrates how Ethernet Y-cables 100 according to embodiments of the present disclosure may be used to connect a plurality of host devices that are mounted on the equipment cabinet to a communications network through either a primary network switch or a secondary network switch. In FIG. 2, each Ethernet Y-cable 100 includes a base cable segment 102 that may be selectively connected to one of two distal cable segments 104, 106, as will be discussed in greater detail below. Each of these cable segments 102, 104, 106 may include an RJ-45 plug on the far end thereof.

As shown in FIG. 2, the Ethernet Y-cables 100 may be used to connect a plurality of host devices 20 that are mounted within an equipment cabinet 10 to a pair of top-of-rack network switches 30, 40. Each of the host devices 20 may have a single RJ-45 style connector port 22. The plug on the base cable segment 102 of each Ethernet Y-cable 100 is plugged into the connector port 22 on a respective one of the host devices 20. The plug on the first distal cable segment 104 of each Ethernet Y-cable 100 is plugged into a respective one of the connector ports on the primary network switch 30. The plug on the second distal cable segment 106 of each Ethernet Y-cable 100 is plugged into a respective one of the connector ports on the secondary network switch 40.

Each Ethernet Y-cable 100 comprises a switched cable. In particular, the eight insulated conductors in the base cable segment 102 are selectively connected via eight three-terminal, two-position switches (see FIG. 4) to either (a) respective ones of the eight insulated conductors in the first distal cable segment 104 or (b) respective ones of the eight insulated conductors in the second distal cable segment 106. All eight switches for a given Ethernet Y-cable 100 are set to the same position so that each Ethernet Y-cable 100 acts as a standard Ethernet patch cord that connects the connector port 22 on a respective one of the host devices 20 to one of the connector ports on the network switch 30 or, alternatively, to one of the connector ports on the secondary network switch 40. While the Ethernet Y-cables 100 that are depicted in FIG. 2 each have a short cable segment that connects to a respective one of the host devices 20 and two long cable segments that connect to the primary and secondary network switches 30, 40, respectively, it will be appreciated that the length of the cable segments may be varied. For example, in another embodiment, each Ethernet Y-cable 100 could include a long cable segment that connects to a respective one of the host devices 20 and two short cable segments that connect to the primary and secondary network switches 30, 40, respectively.

As is clear from a comparison of FIGS. 1 and 2, the use of the Ethernet Y-cables 100 according to embodiments of the present disclosure allows the use of host devices 20 that have only a single connector port 22, without sacrificing having the ability to switch the host devices 20 to route communications through a secondary network switch 40 in the event of a failure at the primary network switch 30. In addition, as illustrated in FIG. 2, the Y-junction on the Ethernet Y-cables 100 may be located near the distal end of the cable so that the Ethernet Y-cable 100 includes a long base cable segment 102 and two short distal cable segments 104, 106, Consequently, the total amount of linear feet of cabling required to interconnect the equipment in the cabinet 12 of FIG. 2 may be significantly less (e.g., only about 55%-75%) of the amount of linear feet of cabling required to interconnect the equipment in the cabinet 10' of FIG. 1. This reduction in the amount of cabling required can simplify cable management issues at the equipment rack 10, and may also reduce the overall cost of the cabling (albeit this reduction may be offset by the increased cost of an Ethernet Y-cable patch cord as compared to the cost of conventional patch cords).

As is discussed in greater detail herein, in some embodiments, each Ethernet Y-cable 100 may include a sensing circuit that is configured to sense a failure in a communications link between the base cable segment 102 and one of the first distal cable segment 104 or the second distal cable segment 106. This sensing circuit may, for example, since the failure in the communications link by sensing for the presence or absence of a physical layer link signal on one or more of the conductors of the Ethernet Y-cable 100. If the sensing circuit detects a failure in the communications link, the sensing circuit may output a control signal that causes the switches in the Ethernet Y-cable 100 to change position so that the Ethernet Y-cable 100 connects the base cable segment 102 to the other of the distal cable segments 104, 106.

Figure 3:
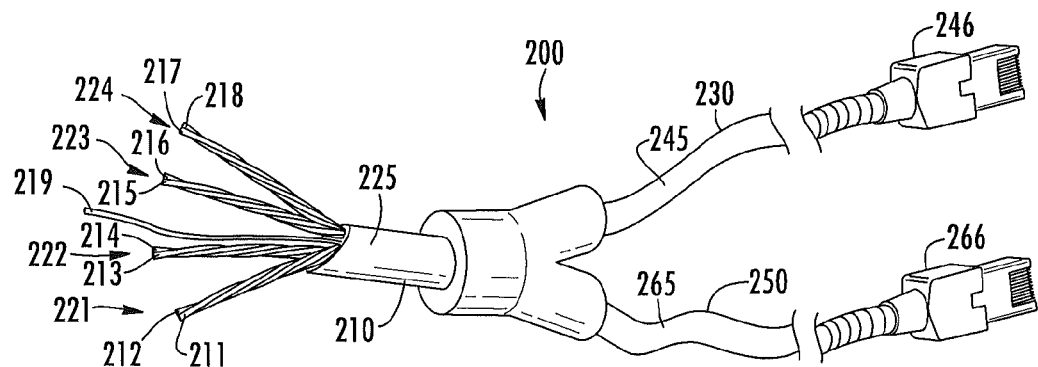
FIG. 3 is a perspective view of an Ethernet Y-cable according to embodiments of the present disclosure.
Figure 4:
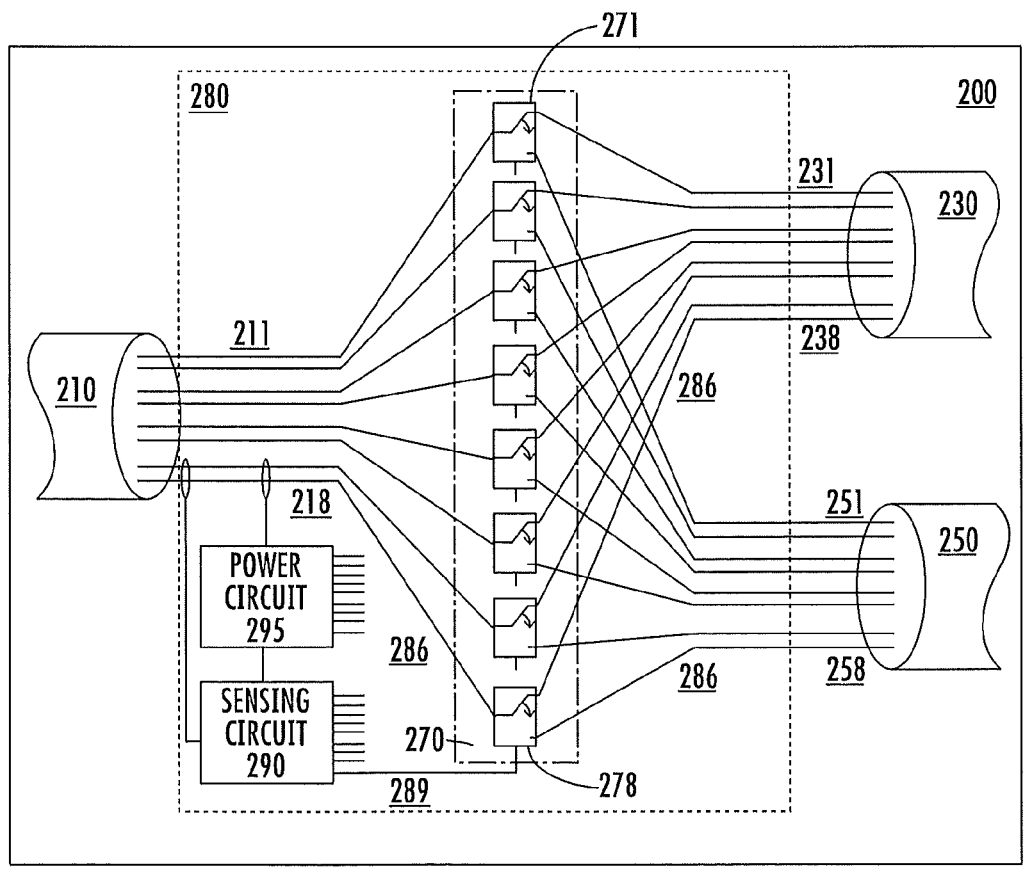
FIG. 4 is a schematic circuit diagram of the Ethernet Y-cable of FIG. 3.
Figure 6:
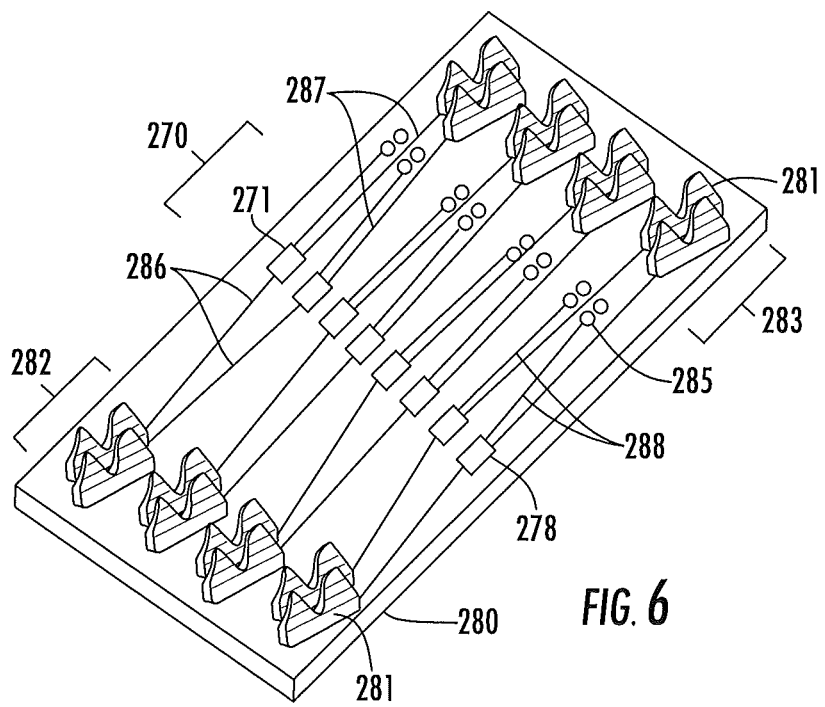
FIG. 6 is a schematic perspective view of a printed circuit board that includes a switching circuit of the Ethernet Y-cable of FIG. 3.

FIGS. 3, 4 and 6 illustrate an Ethernet Y-cable 200 according to embodiments of the present disclosure that can be used, for example, to implement the Ethernet Y-cables 100 that are used to interconnect the equipment in the cabinet 10 of FIG. 2. In particular, FIG. 3 is a perspective view of the Ethernet Y-cable 200, FIG. 4 is a schematic circuit diagram of the Y-junction of the Ethernet Y-cable 200, and FIG. 6 is a schematic perspective view of a printed circuit board of the Ethernet Y-cable 200.

As shown in FIGS. 3 and 4, the Ethernet Y-cable 200 has a base cable segment 210 and first and second distal cable segments 230, 250. The base cable segment 210 includes first through eighth insulated conductors 211-218. Each insulated conductor 211-218 may comprise, for example, a copper wire that is sheathed with a suitable insulative material such as, for example, a flexible plastic material having flame retardant and smoke suppressing properties. The eight insulated conductors 211-218 may be arranged as four tightly twisted pairs 221-224 of conductors. Each twisted pair 221-224 may be twisted at a different twist rate. The twist rate for each twisted pair may also purposefully vary over a predetermined range. This purposeful variation may or may not be a random variation. A separator 219 may be provided such as a tape or an elongated cruciform. The separator 219 separates one or more of the twisted pairs 221-224 from one or more of the other twisted pairs 221-224. The separator 219 may be formed of a flexible, electrically insulative material such as, for example, polyethylene. The twisted pairs 221-224 and any separator 219 may be twisted together to have a core twist. The twisted pairs 221-224 and the separator 219 may be encased in an outer jacket 225. A plug connector 226 (not shown in FIG. 3 so that the internal components of the base cable segment may be illustrated) may be terminated onto one end of base cable segment 210. The plug connector 226 may comprise, for example, an RJ-45 plug.

The first distal cable segment 230 includes first through eighth insulated conductors 231-238 which are not visible in FIG. 3 but which may be identical to the insulated conductors 211-218 of the base cable segment 210 that are described above. The insulated conductors 231-238 may be arranged as four tightly twisted pairs 241-244 of conductors, which may be identical to the twisted pairs 221-224 that are described above. A separator (not shown in FIG. 3) may be provided such as a separator tape or an elongated cruciform separator that separates one or more of the twisted pairs 241-244 from one or more of the other twisted pairs 241-244. The four twisted pairs 241-244 and any separator may all be twisted together in a core twist. The twisted pairs 241-244 and the separator may be encased in an outer jacket 245. A plug connector 246 may be terminated onto the far end of the first distal cable segment 230. The plug connector 246 may comprise, for example, an RJ-45 plug.

The second distal cable segment 250 includes first through eighth insulated conductors 251-258 which are not visible in FIG. 3 but which may be identical to the insulated conductors 211-218 that are described above. The insulated conductors 251-258 may be arranged as four tightly twisted pairs 261-264 of conductors, which may be identical to the twisted pairs 221-224 that are described above. A separator (not shown in FIG. 3) may be provided such as a separator tape or an elongated cruciform separator that separates one or more of the twisted pairs 261-264 from one or more of the other twisted pairs 261-264. The twisted pairs 261-264 and any separator may all be twisted together in a core twist. The twisted pairs 261-264 and the separator may be encased in an outer jacket 265. A plug connector 266 may be terminated onto the far end of the second distal cable segment 250. The plug connector 266 may comprise, for example, an RJ-45 plug.

In some embodiments, each cable segment 210, 230, 250 of Ethernet Y-cable 200 may have a different colored cable jacket (e.g., the base cable segment 210 has a blue cable jacket 225, the first distal cable segment 230 has a yellow cable jacket 245, and the second distal cable segment 250 has a green cable jacket 265). The provision of different colored cable segments may make it easier to manage the cables and track connections.

Turning now to FIGS. 4 and 6, it can be seen that the Ethernet Y-cable 200 further includes a switching mechanism 270. The switching mechanism 270 may comprise eight three-terminal, two-position switches 271-278. In some embodiments, the switches 271-278 may be mounted on a printed circuit board 280. As shown in FIG. 6, the printed circuit board 280 may include twenty-four wire connection terminals 281 that are mounted in respective pairs of metal plated vias 285 in the printed circuit board 280, and that are arranged as three sets 282, 283, 284 of eight wire connection terminals. Note that in FIG. 6 only sets 282 and 283 are visible; the wire connection terminals 281 of set 284 are mounted on the underside of printed circuit board 280 in the pairs of metal-plated vias 285 that are visible in FIG. 6). The wire connection terminals 281 may comprise, for example, insulation piercing contacts as shown in FIG. 6 or insulation displacement contacts. The first set 282 of eight wire connection terminals 281 may receive the eight insulated conductors 211-218 of the base cable segment 210. The second set 283 of eight wire connection terminals 281 may receive the eight insulated conductors 231-238 of the first distal cable segment 230. The third set 284 of eight wire connection terminals 281 may receive the eight insulated conductors 251-258 of the second distal cable segment 250. Each wire connection terminal 281 may be configured to receive its respective insulated conductor from the cable segment and pierce the insulation thereof in order to provide an electrical connection between the insulated conductor and the metal-plated vias 285 that hold the wire connection terminal 281. Conductive traces 286, 287, 288 are provided in or on the printed circuit board 280. Each conductive trace 286 may electrically connect one of the metal plated vias to the appropriate terminal on the switches 271-278. In particular, the conductive traces 286 connect each wire connection terminal 281 in the first set 282 to the insulated conductors 211-218 in the base cable segment 210 are connected to an input terminal of a respective one of the switches 271-278, the conductive traces 287 connect each wire connection terminal 281 in the second set 283 to a first output terminal of a respective one of the switches 271-278, and the conductive traces 288 connect each wire connection terminal 281 in the third set 284 to a second output terminal of a respective one of the switches 271-278. Thus, as shown in FIGS. 4 and 6, the wire connection terminals 281, metal-plate vias 285 and conductive traces 286, 287, 288 provide electrical paths that connect each insulated conductor of the cable segments 210, 230 and 250 to their appropriate terminals on the switches 271-278.

As is further shown in FIG. 4, the Ethernet Y-cable 200 may further include a sensing circuit 290. The sensing circuit 290 may be configured to sense whether or not a properly operating communications link exists between a device that is connected to the base cable segment 210 and one or both of second and third devices that are connected to the first and second distal cable segments 230, 250, respectively. In some embodiments, the sensing circuit 290 may comprise a circuit that senses the presence or absence of a physical layer link signal that will be carried on certain of the insulated conductors of the Ethernet Y-cable 200 if the end devices connected by the active path of the Ethernet Y-cable 200 are operating properly. Various techniques are known in the art for sensing the presence of a signal, and any suitable technique may be used. The sensing circuit 290 may output one or more control signals that are used to control the switches 271-278. In the embodiment of FIGS. 3, 4 and 6, the sensing circuit outputs a separate control signal for each switch 271-278; however, it will be appreciated that a common control signal may be used to control all eight switches in other embodiments. To simplify the drawing, the full control signal connection 289 is only shown between the sensing circuit 290 and switch 278 in FIG. 4. It will be appreciated, however, that a control signal connection is provided from sensing circuit 290 to the control terminal on each of the switches 271-278. Although illustrated as sensing the link on the base cable segment 210, the sensing circuit 290 may be configured to sense the link on the first or second distal cable segments 230, 250 and/or at the Y-junction.

In some embodiments, the Ethernet Y-cable 200 may include active components such as, for example, transistors that are used to implement the switches 271-278 and/or components of the sensing circuit 290. In some embodiments, power-over-Ethernet techniques may be used to deliver the power required to operate these active devices to the switching mechanism 270. In particular, as shown in FIG. 4, a power conversion circuit 295 may receive a power signal (e.g., a direct current voltage) over at least one of the insulated pairs of conductors in one of the cable segments of Ethernet Y-cable 200 and condition that voltage as necessary to provide an operating voltage that is used to power the active components of the switching mechanism 270 and/or any active components of the sensing circuit 290. As power-over-Ethernet techniques are well known in the art, further description thereof will be omitted here. Again, to simplify FIG. 4, the full operating power connections between the power conversion circuit 295 and the switches 271-278 are not shown, but are represented by the eight output lines extending from the right side of the box representing power conversion circuit 295. It will likewise be appreciated that other power sources may be used such as, for example, a separate connection to an external power source.

Operation of the Ethernet Y-cable 200 of FIGS. 3, 4 and 6 will now be described with respect to the flow chart of FIG. 5 and with reference to FIGS. 2-4 and 6.

Figure 5:
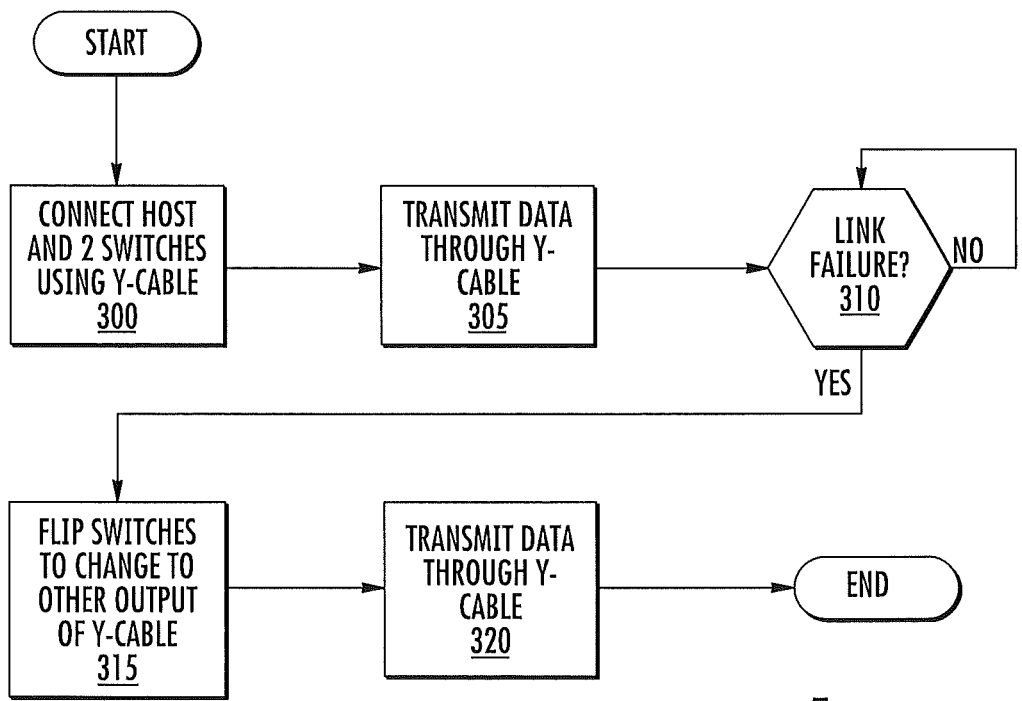
FIG. 5 is a flowchart illustrating operations for selectively coupling an RJ-45 connector port of a host device to either an RJ-45 connector port on a first network switch or to an RJ-45 connector port on a second network switch according to certain embodiments of the present disclosure.

As shown in FIG. 5, operations may begin with the base cable segment 210 of the Ethernet Y-cable 200 being plugged into or otherwise connected to a first device (e.g., one of the host devices 20 of FIG. 2), the first distal cable segment 230 of the Ethernet Y-cable 200 being plugged into or otherwise connected to a second device (e.g., the network switch 30 of FIG. 2), and the second distal cable segment 250 of the Ethernet Y-cable 200 being plugged into or otherwise connected to a third device (e.g., the network switch 40 of FIG. 2) (block 300). The switching mechanism 270 of Ethernet Y-cable 200 is configured so that the insulated conductors 211-218 of the base cable segment 210 are connected to the corresponding insulated conductors 231-238 in the first distal cable segment 250 and so that an open circuit exists between the insulated conductors 211-218 of the base cable segment 210 and their corresponding insulated conductors 251-258 in the second distal cable segment 250.

The Ethernet Y-cable 200 is then used to carry data communications that are transmitted between the first device and the second device (block 305). The sensing circuit 290 automatically monitors for any failure that disrupts these data communications (block 310). If no failure is detected at block 310, the monitoring may continue. If, however, a failure is detected, then the switches 271-278 in the Ethernet Y-cable are flipped so that the insulated conductors 211-218 of the base cable segment 210 are connected to the corresponding insulated conductors 251-258 in the second distal cable segment 250 and so that an open circuit exists between the insulated conductors 211-218 of the base cable segment 210 and their corresponding insulated conductors 231-238 in the first distal cable segment 230 (block 315). Finally, the Ethernet Y-cable 200 is then used carry data communications that are transmitted between the first device and the third device (block 320).

Figure 7A:
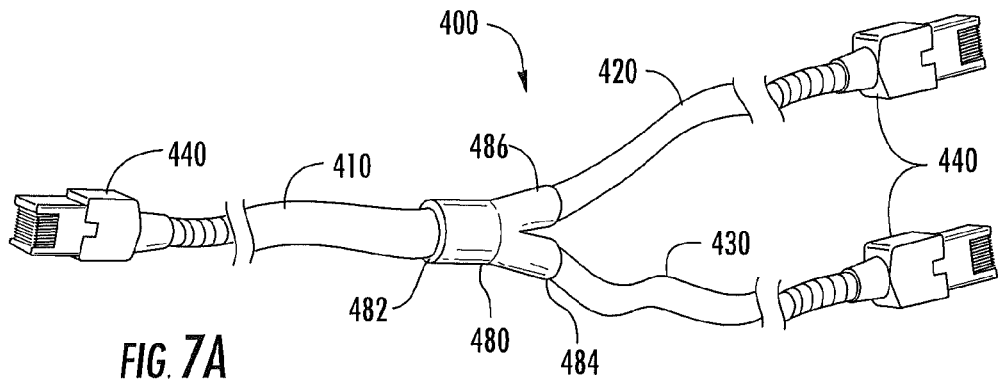
FIG. 7A is a perspective view of an Ethernet Y-cable according to further embodiments of the present disclosure.
Figure 7B:
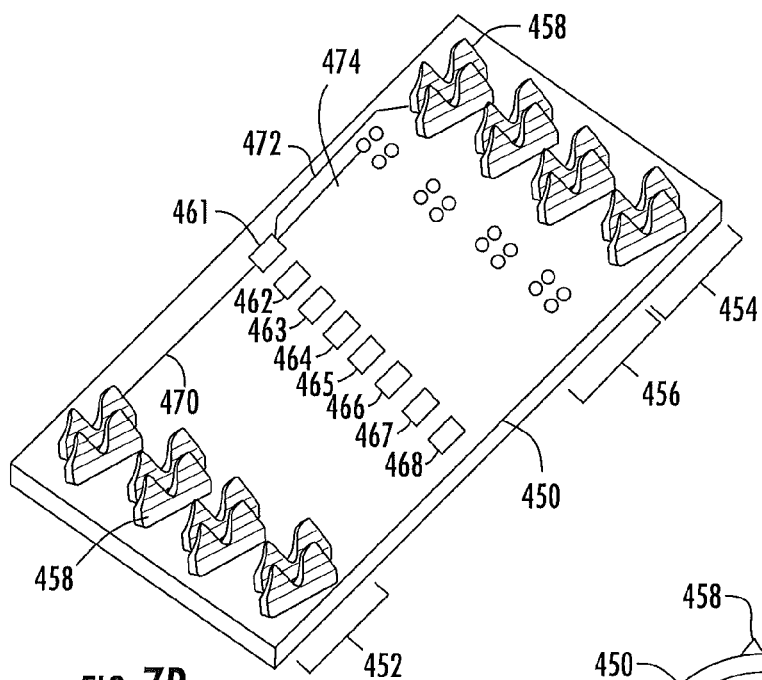
FIG. 7B is a schematic perspective view of a flexible printed circuit board that is included in the Ethernet Y-cable of FIG. 7A.
Figure 7C:
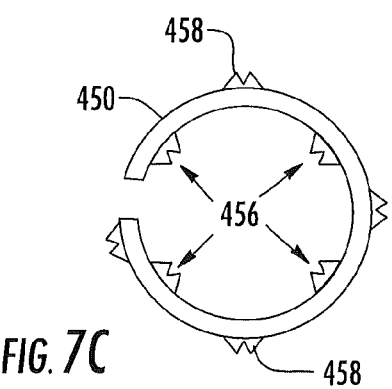
FIG. 7C is an end view of the flexible printed circuit board of FIG. 7B after it has been rolled into a generally cylindrical shape.

FIG. 7A is a perspective view of an Ethernet Y-cable 400 according to further embodiments of the present disclosure. FIG. 7B is a schematic perspective view of a flexible printed circuit board that is included in the Ethernet Y-cable 400 of FIG. 7A, and FIG. 7C is an end view of this flexible printed circuit board after it has been rolled into a generally cylindrical shape.

As shown in FIG. 7A, the Ethernet Y-cable 400 includes a base cable segment 410, a first distal cable segment 420 and a second distal cable segment 430. The cable segments 410, 420, 430 may be identical to the cable segments 210, 230, 250, respectively, that are discussed above with respect to FIGS. 3 and 4, and hence further description thereof will be omitted here. Each of the cable segments 410, 420, 430 may include an RJ-45 plug 440 on its distal end. The Ethernet Y-cable 400 further includes a housing 480 that holds a flexible printed circuit board 450 (see FIGS. 7B and 7C). In the depicted embodiment, the housing 480 comprises a generally Y-shaped housing having a generally cylindrical base 482 and generally cylindrical legs 484, 486.

The Ethernet Y-cable 400 includes a flexible printed circuit board 450 that is rolled into a generally cylindrical shape. As shown in FIG. 7B (which depicts the flexible printed circuit board 450 before it has been rolled into the cylindrical shape), three sets 452, 454, 456 of eight insulation piercing contacts 458 (only sets 452 and 454 are visible in FIG. 7B) each are mounted in corresponding metal-plated vias (not shown) in the flexible printed circuit board 450. The insulation piercing contacts 458 may be arranged in pairs so as to maintain the twist in the insulated conductors of the twisted pair of the cable segment that each pair of insulation piercing contacts 458 receives right up to the point at which the insulated conductors are terminated into their respective insulation piercing contacts 458. This may help reduce or minimize near end crosstalk between the four twisted pairs of insulated conductors in each cable segment 410, 420, 430.

The first set 452 of eight insulation piercing contacts 458 are mounted adjacent a first end of the flexible printed circuit board 450 and extend outwardly therefrom. Each insulation piercing contact 458 in the first set 452 receives a respective one of the insulated conductors of the base cable segment 410. As shown in FIG. 7C, when the flexible printed circuit board 450 is rolled into a cylinder, the pairs of insulation piercing contacts 458 in the first set 452 may be spaced approximately ninety degrees apart around the outside periphery of the rolled flexible printed circuit board 450 to further facilitate reducing the crosstalk between the insulated conductors of the base cable segment 410.

Similar to the first set 452, the second set 454 of eight insulation piercing contacts 458 are mounted adjacent a second end of the flexible printed circuit board 450, and extend outwardly therefrom. The second end of the flexible printed circuit board 450 is opposite the first end thereof. Each insulation piercing contact 458 in the second set 454 receives a respective one of the insulated conductors of the first distal cable segment 420. The pairs of insulation piercing contacts 458 in the second set 454 may be spaced approximately ninety degrees apart around the outside periphery of the rolled flexible printed circuit board 450 to further reduce the crosstalk between the insulated conductors of the first distal cable segment 420.

The third set 456 of eight insulation piercing contacts 458 (not visible in FIG. 7B) are also mounted adjacent the second end of the flexible printed circuit board 450 but, unlike the first and second sets 452, 454, the third set 456 of insulation piercing contacts 458 extend inwardly so that they extend into the cylinder defined by the rolled flexible printed circuit board 450. Each insulation piercing contact 458 in the third set 456 receives a respective one of the insulated conductors of the second distal cable segment 430. The pairs of insulation piercing contacts 458 in the third set 456 may be spaced approximately ninety degrees apart around the inside periphery of the rolled flexible printed circuit board 450 to further facilitate reducing the crosstalk between these conductors. The pairs of insulation piercing contacts 458 in the third set may be spaced approximately forty-five degrees apart from the pairs of insulation piercing contacts 458 in the second set 454 in some embodiments.

Eight four terminal switches 461-468 (see FIG. 7B) are surface mounted on the flexible printed circuit board 450. The switches 461-468 may be identical to the three-terminal, two-position switches 271-278 that are depicted in the circuit diagram of FIG. 4. Accordingly, the input terminal of each switch 461-468 is selectively electrically connected to one of a first output terminal or a second output terminal based on the value of a control signal that is input to a control terminal of the switch 461-468.

A plurality of conductive traces 470, 472, 474 such as copper traces are provided on or in the flexible printed circuit board 450 (only the conductive traces 470, 472, 474 associated with switch 461 are shown in FIG. 7B to simplify the drawing, but it will be appreciated that similar or identical conductive traces 470, 472, 474 will be provided that are associated with each of switches 462-468). In particular, eight conductive traces 470 are provided that electrically connect each of the eight insulation piercing contacts 458 in the first set 452 to the input terminals of the respective switches 461-468. Similarly, eight conductive traces 472 are provided that connect each of the eight insulation piercing contacts 458 in the second set 454 to the first output terminals of the respective switches 461-468. Finally, eight conductive traces 474 are provided that connect each of the eight insulation piercing contacts 458 in the third set 456 to the second output terminals of the respective switches 461-468. In some embodiments, the conductive traces 470, 472, 474 that are associated with each respective pair of insulation piercing contacts may repeatedly cross each other on different layers of the flexible printed circuit board 450 in order to maintain the twist of the pair of conductors across the flexible printed circuit board 450. This may help reduce crosstalk between the different pairs. Other crosstalk reduction and/or compensation techniques may also be implemented on the printed circuit board 450.

As shown in FIG. 7A, the Ethernet Y-cable 400 further includes a housing 480 for the flexible printed circuit board 450. The housing 480 comprises a generally Y-shaped housing having a generally cylindrical base 482 and legs 484, 486. The first cable segment 410 is received within a generally circular opening in the base 482. A cable strain relief mechanism (not shown) may be provided that assists in holding the first cable segment 410 within the opening in the base 482. The interior surface of the housing 480 may include a plurality of channels (not visible) in FIG. 7A that are configured to hold and route the insulated conductors of the first cable segment 410 and to position the insulated conductors above a respective one of the insulation piercing contacts 458 of the first set 452. The housing 480 may comprise a multi-piece housing that snaps together or is otherwise joined such as, for example, by ultrasonic welding. When the two pieces of the housing 480 are joined together, the housing 480 presses the insulated conductors of the first cable segment 410 into their respective insulation piercing contacts, and one or more blade portions of each insulation piercing contact 458 pierces the insulation and makes physical and electrical contact with the conductor disposed therein. The housing pieces, once joined, may also help hold the insulated conductors of the first cable segment 410 in place in order to maintain the electrical connection between each insulated conductor and its respective insulation piercing contact 458.

The second cable segment 420 is received within a generally circular opening in the first leg 484 of the housing 480. A strain relief mechanism (not shown) may be provided that assists in holding the second cable segment 420 within the opening in the first leg 484. The interior surface of the housing 480 may include a plurality of channels (not visible) that are shaped to hold the insulated conductors of the second cable segment 420 and to position the insulated conductors above a respective one of the insulation piercing contacts 458 of the second set 454. When the two pieces of the housing of the first cable segment 410 are joined together the housing 480 presses the insulated conductors of the second cable segment 420 into their respective insulation piercing contacts, and one or more blade portions of each contact pierces the insulation and makes physical and electrical contact with the conductor disposed therein.

The third cable segment 430 is received within a generally circular opening in the second leg 486. A strain relief mechanism (not shown) may be provided that assists in holding the third cable segment 430 within the opening in the second leg 486. The interior surface of the housing 480 may include a plurality of channels that are configured to hold and route the insulated conductors of the third cable segment 430 and to position the insulated conductors above a respective one of the insulation piercing contacts 458 of the third set 456. The housing 480 may have an internal piece (which may comprise a third housing piece or which may be part of one of the first or second housing pieces) that is not shown in the drawings. This internal housing piece may include a plurality of external channels that are shaped to hold the insulated conductors of the third cable segment 430 and to align the insulated conductors with a respective one of the insulation piercing contacts 458 of the third set 456. The flexible printed circuit board 450 may be rolled tightly around the internal housing piece so that the insulated conductors of the third cable segment 430 are pressed into their respective insulation piercing contacts 458, and one or more blade portions of each contact pierces the insulation and makes physical and electrical contact with the conductor disposed therein. In this fashion, each of the insulated conductors of the first, second and third cable segments 410, 420, 430 may be electrically connected to the flexible printed circuit board 450, and the switches 461-468 on the flexible printed circuit board 450 may be used to selectively connect the insulated conductors of the first cable segment 410 to their respective insulated conductors in either the second cable segment 420 or in the third cable segment 430. Although not illustrated, it will be appreciated that the contacts 458 in one or more of the sets 452, 454, 456 may be offset longitudinally along the length of their corresponding cable segment to reduce the profile of the housing and/or to reduce crosstalk.

Figure 8:
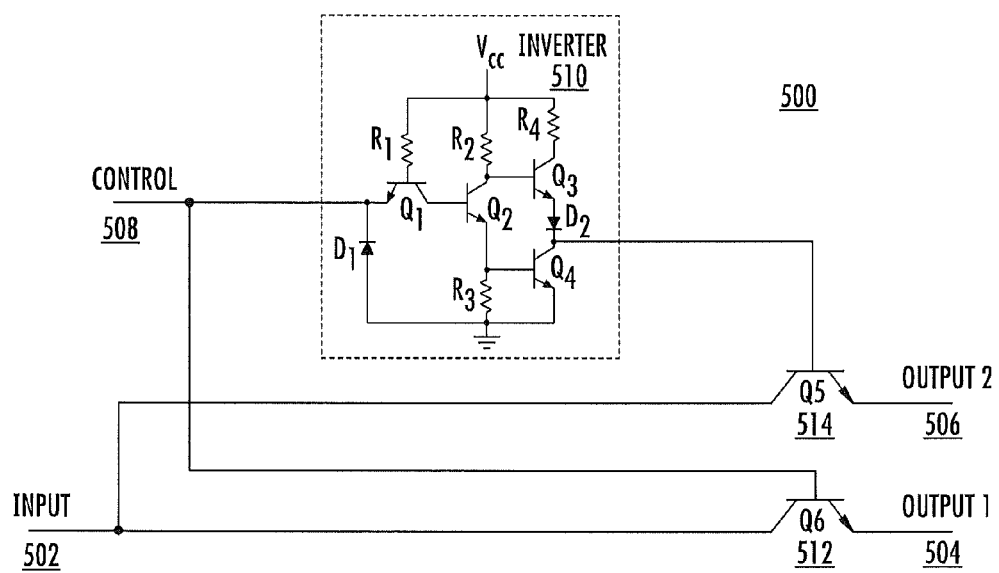
FIG. 8 illustrates a switch which may be used to implement the switches included in the Ethernet Y-cable of FIGS. 7A-7C.

The switches 461-468 may be formed, for example, using integrated circuits chips that are surface mounted on the flexible printed circuit board 450. FIG. 8 illustrates a switch 500 which may be used to implement each of the switches 461-468 of FIG. 7B.

As shown in FIG. 8, the switch 500 includes an input terminal 502, a first output terminal 504 and a second output terminal 506. The input terminal 502 may be electrically connected to one of the insulated conductors in the base cable segment 410, the first output terminal 504 may be electrically connected to one of the insulated conductors in the first distal cable segment 420, and the second output terminal 506 may be electrically connected to one of the insulated conductors in the second distal cable segment 430. The switch 500 further includes a control input 508 that receives a control signal from an external circuit element.

The switch 500 further includes an inverter 510, a first switching transistor 512 and a second switching transistor 514. The first switching transistor 512 acts as a switch that opens or closes a current carrying path between the input terminal 502 and the first output terminal 504. The second switching transistor 514 similarly acts as a switch that opens or closes a current carrying path between the input terminal 502 and the second output terminal 506. A control signal that is received at the control input 508 is fed to the control terminal on the first switching transistor 512. This same control signal is also fed to the inverter 510, and the output of the inverter 510 is fed to the control terminal on the second switching transistor 512. In this fashion, the control signal may be used to simultaneously open one of the first switching transistors 512, 514 while closing the other so that a signal that is input to input terminal 502 may flow to either the first output terminal 504 or the second output terminal 506. It will be appreciated that numerous alternative switch designs could be used.

It will be appreciated that the Ethernet Y-cables according to embodiments of the invention should be designed to have acceptable near-end and far-end crosstalk performance. As noted above, various techniques may be used to reduce the amount of crosstalk that arises in any wire connection terminals that are used to electrically connect the insulated conductors of the cable segments to, for example, a printed circuit board and/or to reduce the amount of crosstalk that arises on the printed circuit board. Various additional or other crosstalk reduction and/or crosstalk compensation techniques may also be used such as, for example, the crosstalk compensation techniques that are commonly used in RJ-45 jacks. It will further be appreciated that the Ethernet Y-cables according to embodiments of the present invention preferably have good or at least acceptable impedance matching in order to have acceptable return loss performance.

Figure 9:
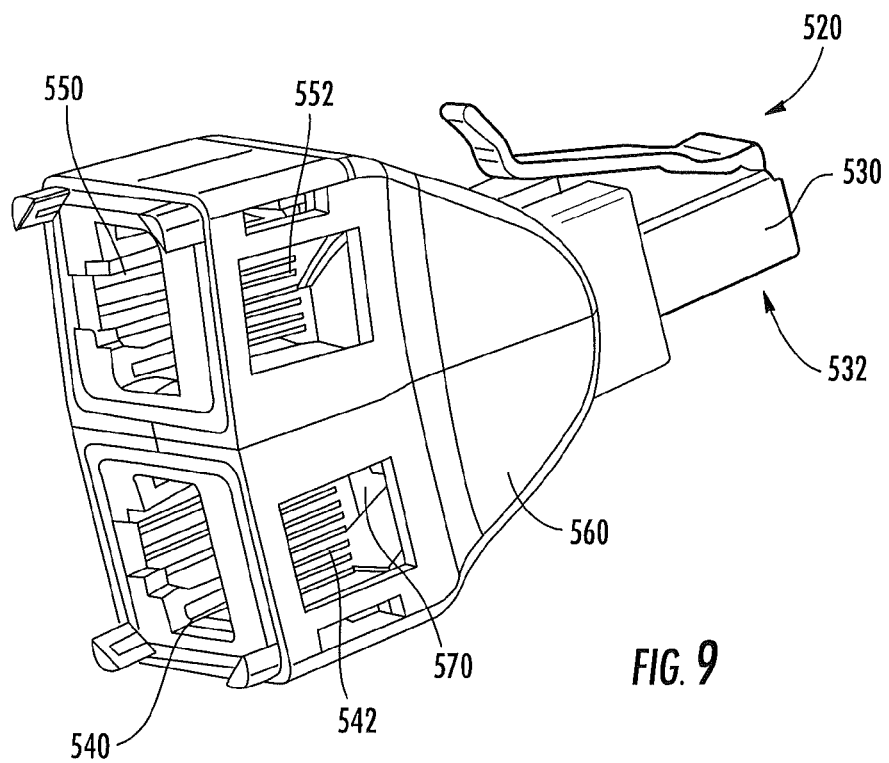
FIG. 9 is a schematic perspective view of a connector port mounted Ethernet Y-switch according to certain embodiments of the present disclosure.

While the above discussion has focused on Ethernet Y-cables, it will likewise be appreciated that Ethernet Y-connectors may be provided that perform the same function. FIG. 9 is a schematic perspective view of a connector port mounted Ethernet Y-switch 520 according to certain embodiments of the present disclosure.

As shown in FIG. 9, the Ethernet Y-switch 520 comprises a "plug-jack" connector that includes a plug 530 on one end thereof and a pair of jacks 540, 550 that are mounted opposite the plug 530. The plug 530 and jacks 540, 550 may be mounted in a common housing 560. The plug 530 may be very similar to a standard RJ-45 plug, and may be configured to be plugged within an industry-standardized RJ-45 connector port of an end device such as one of the servers 20' of FIG. 1. The plug 530 includes 8 plug blades 532 (not visible in FIG. 9) that mate with the eight jack contacts of the end device connector port. In some embodiments, these eight plug blades 532 may be mounted on a common printed circuit board 570 that is received within the housing 560.

Each jack 540, 550 may include a set of eight spring contacts 542, 552, respectively. The jacks 540, 550 may be configured to receive an industry-standardized RJ-45 plug, and this each jack may receive the plug of a patch cord such as one of the patch cords 50' and one of the patch cords 60' in FIG. 1. Jack 540 includes a set of eight spring contacts 542 that are configured to mate with the respective eight plug blades of an RJ-45 plug of a mating patch cord 50'. Jack 550 includes a set of eight spring contacts 552 that are configured to mate with the respective eight plug blades of an RJ-45 plug of a mating patch cord 60'. Each of the sixteen spring contacts in the sets of spring contacts 542, 552 may have a base end that is mounted in the common printed circuit board 570.

The common printed circuit board 570 may be similar to the printed circuit board 280 discussed above with reference to FIGS. 4 and 6, except that the plug blades 532 are provided in place of the set 282 of insulation piercing contacts, and the sets of spring contacts 542, 552 are provided in place of the sets 283, 284 of insulation piercing contacts, respectively. The plug blades 532 and sets of spring contacts 542, 552 may each be mounted in metal-plated vias in the common printed circuit board 570. Eight three-terminal, two position switches such as the switches 271-278 illustrated in FIG. 4 may be mounted on the common printed circuit board 570. Eight conductive traces 286 may electrically connect each of the metal-plated vias that receive the plug blades 532 to the input terminals on the respective switches 271-278. Another eight conductive traces 286 may be provided that connect the first output terminal on each of the switches 271-278 to a respective one of the metal-plated vias that hold the spring contacts of the first set of spring contacts 542. Yet another eight conductive traces 286 may be provided that connect the second output terminal on each of the switches 271-278 to a respective one of the metal-plated vias that hold the spring contacts of the second set of spring contacts 552. The common printed circuit board 570 may likewise include the sensing circuit 290 and the power conversion circuit 295 that are included on the printed circuit board 280 of FIGS. 4 and 6. As operation of these components is discussed above, it will not be repeated here.

The switching mechanism provided in the Ethernet Y-switch 520 may operate in the exact same manner as the switching mechanism 270 provided in Ethernet Y-cable 200. In essence, the Ethernet Y-switch 520 simply acts to move the location where the switching occurs closer to the end device (e.g., one of the servers 20' depicted in FIG. 1). The use of Ethernet Y-switch 520 allows the use of conventional patch cords as opposed to the specialized patch cords 200 described above, but may increase the amount of cabling required and likewise necessitates the use of specialized plug jack connectors that are not required in the conventional system of FIG. 1 or in the system according to embodiments of the present disclosure that is illustrated in FIG. 2. The Ethernet Y-switches 520 may also have a practical advantage in that they may provide additional space for implementing the switching mechanism which may facilitate providing a solution that has improved crosstalk and/or return loss performance.

A plurality of Ethernet Y-switches 520 may be used in the system depicted in FIG. 1. In such a system, each of the servers 20' only needs to have a single connector port 22'. The plug 530 of an Ethernet Y-switch 520 is mounted in each connector port 22' of the servers 20'. One end of each patch cord 50' is plugged into the jack 540 of a respective one of the Ethernet Y-switches 520, and the other end of each patch cord 50' is plugged into a respective connector port on switch 30'. Similarly, one end of each patch cord 60' is plugged into the jack 550 of a respective one of the Ethernet Y-switches 520, and the other end of each patch cord 60' is plugged into a respective connector port on switch 40'. The sensing circuit 290 on each Ethernet Y-switch 520 may sense a failure in the communication link between, for example, the server 20' that the Ethernet Y-switch is mounted in and the network switch 30'. Upon sensing this failure, the Ethernet Y-switch 520 automatically flips each of the switches 271-278 to connect the server 20' to the secondary network switch 40'.

Figure 10:
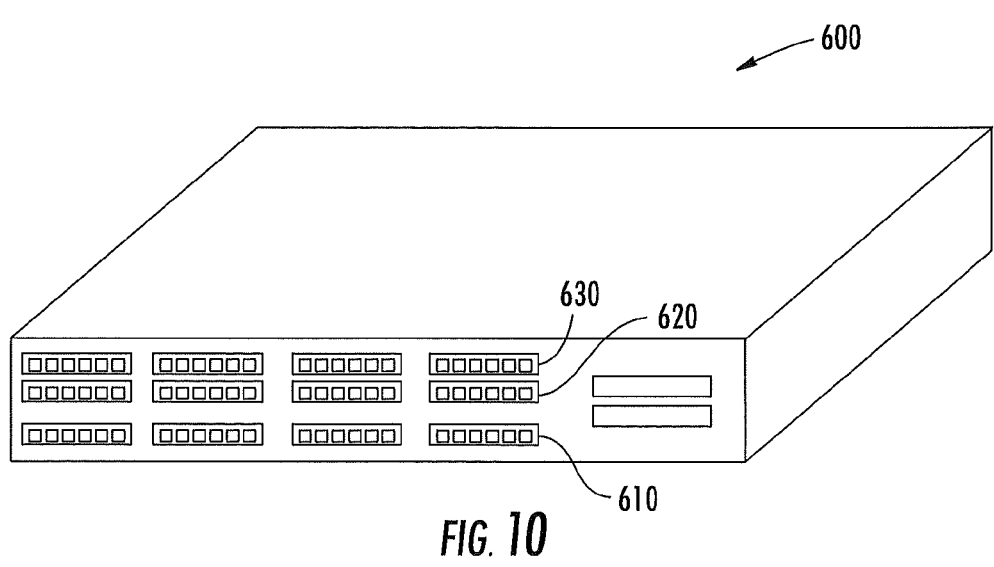
FIG. 10 is a perspective view of a rack mounted Ethernet switching unit according to certain embodiments of the present disclosure.

As discussed above, a plurality of Ethernet Y-switches 520 would be used in the system of FIG. 1 (i.e., one switch 520 per host device 20'). Pursuant to still further embodiments of the present invention, the Ethernet switch units 600 are provided that combine the functionality of a plurality of the Ethernet Y-switches 520 into a single rack-mounted unit. FIG. 10 is a perspective view of such an Ethernet switch unit 600. The Ethernet switch unit may be mounted, for example, just below the network switch 30' in the equipment cabinet 10' of FIG. 1.

As shown in FIG. 10, the Ethernet switch 600 includes a first set of "input" connector ports 610 and first and second sets 620, 630 of "output" connector ports. A first set of patch cords may be provided that are used to connect the respective connector ports 22' on host devices 20' of FIG. 1 to a respective one of the input connector ports 610. Each of the connector ports 610 may include eight spring contacts (not shown in FIG. 10). Each of these spring contacts may be electrically connected to an input terminal of a respective three-terminal, two position switch such as the switches 271-278 in FIG. 4. The first output terminal on each of these eight switches is electrically connected to a respective spring contact of one of the connector ports 620. The second output terminal on each of these eight switches is electrically connected to a respective spring contact of one of the connector ports 630. In this fashion, each connector port 610 may be selectively connected to either (1) one of the connector ports 620 or (2) one of the connector ports 630.

A second set of patch cords may be provided that connect each of the connector ports 620 to a respective connector port on the switch 30' of FIG. 1. A third set of patch cords may be provided that connect each of the connector ports 630 to a respective connector port on the switch 40' of FIG. 1. In this fashion, the Ethernet Y-switching unit 600 may provide communications paths from a host device to connector ports on each of two network switches.

In some embodiments, the Ethernet switching unit 600 may include a sensing unit that may be used to sense a failure on any of the communications links between the host devices 20' and either the network switch 30' or the network switch 40'. This sensing unit may be identical to the sensing unit 290 discussed above, except that it performs the sensing for a plurality of communications paths instead of a single path.

Typically, the Ethernet Y-switching unit 600 would receive power directly from the equipment cabinet or rack, and hence it may not be necessary to use. Power-over-Ethernet techniques to provide power to the units 600. The units 600 may include power circuitry that condition power received from the equipment rack or cabinet to provide power supply voltages that are at the correct levels to power the active devices included in the switching unit 600. Moreover as the switching units 600 may have significantly more available space as compared to, for example, the Ethernet Y-cables 200 and/or the Ethernet Y-switches 520 described above, it may be possible to use, for example, electro-mechanical or mechanical switches in the switching unit 600 to switch each connector port to selectively connect to a corresponding one of the connector ports 620 or to a corresponding one of the connector ports 630.

In some embodiments, the Ethernet switching unit 600 may operate in response to control signals from another device as opposed to operating in response to control signals that are generated by a sensing unit. By way of example, a rack manager or system manager component of the communications network could monitor for failures on the communications links that run through, for example, the network switches 30', 40' of FIG. 1. The switching unit 600 may be in communication with such a rack or system manager. When the rack or system manager senses, for example, that network switch 30' has failed, the rack or system manager may send a control signal to the switching unit 600. This control signal may cause the switching unit 600 to flip each of the switches included therein to switch each host device so that it connects to the network through secondary network switch 40' of FIG. 1. It will likewise be appreciated that the Ethernet Y-cables and Ethernet Y-switches discussed above could likewise operate in response to control signals received from an external source as opposed to control signals generated by internal sensing units in further embodiments of the present disclosure. The inclusion of the ability to flip the switches in response to an external control signal may have additional advantages. By way of example, a system manager could automatically switch all of the host devices on an equipment rack that normally connect to the network through a first network switch to connect to the network through a second network switch in advance of scheduled maintenance on the first network switch.

In some embodiments, the switching unit 600 may be designed to be a very robust unit that is highly unlikely to fail. This is possible because the connector ports 610, 620, 630 are highly reliable passive devices with extremely low failure rates, and the only active components included in switching unit 600 may be simple switching mechanisms (and perhaps a sensing unit) that once again may be very robust. Thus, use of the switching unit 600 does not introduce another point of failure, and provides a mechanism for quickly and automatically remedying a failed network switch.

It will be appreciated that many modifications may be made to the above-described exemplary embodiments that are within the scope of the present invention. By way of example, while FIGS. 4 and 8 illustrate one example of a possible switching circuit, it will be appreciated that any appropriate switching circuit and/or switches may be used, including other integrated circuit and/or electrical switches and/or relays and/or mechanical or electro-mechanical switches. As another example, the cables, connectors and switching units according to embodiments of the present disclosure may be directly powered as opposed to powered through Power-over-Ethernet techniques and/or may use the information signals to, for example, charge a capacitor that is used to provide power to the active components thereof.

While in the discussion above reference is made to a primary network switch for an equipment rack and to a secondary network switch for the equipment rack, it will be appreciated that in some embodiments the default may be to have some host devices connect to the network through the "primary" network switch while other of the host devices on the equipment rack connect to the network through the "secondary" network switch. This arrangement may be preferred because, in the event of a network switch failure, only some of the host devices would lose connectivity to the network. Such an arrangement may minimize the impact of a network switch failure.

Likewise, above references are made to the "input" and first and second "outputs" of the various switches described herein. It will be appreciated that for communications travelling from the host device to a network switch the labels "input" and "output" accurately reflect the direction of travel for the communication signal. However, for return communications from the network switch to the host device one of the output ports will actually receive the signal and pass it to the input port. Thus, it will be appreciated that the term "input" is used as a matter of convenience to refer to the set terminal of the switch and that the terms "first output" and "second output" (and the like) are used to refer to the other two terminals of the switch that the input terminal may be selectively connected to.

The Ethernet cables according to embodiments of the present invention may include a housing that contains the switching mechanism. In some embodiments, this housing may comprise, for example, a hard plastic housing. However, it will be appreciated that in other embodiments different housings may be used. In fact, in some embodiments, the housing might be as simple as a shrink wrap and/or vulcanized encapsulant that is formed over the cable jacket.

While the Ethernet Y-cables discussed above are described as having eight insulated conductors, it will be appreciated that additional conductors may be added to these cables without departing from the scope of the present disclosure. By way of example, one or more additional insulated or no-insulated conductors could be added to one or more of the cable segments of the above-described Ethernet Y-cables that may be used to carry, for example, control signals.

Herein, the term cable encompasses both unterminated cables and patch cords, which are a cable that has a connector such as a plug mounted on at least one end thereof. Accordingly, it will be understood that the term "Ethernet Y-cable" encompasses an Ethernet Y-cable that has, for example, RJ-45 plugs terminated onto one or more of the three cable segments thereof.

While various embodiments have been described above, it will be appreciated that the disclosed embodiments are not intended to be limiting, and are only provided by way of example, and that the present application is to cover all modifications, equivalents, and alternatives falling within the spirit and scope of the claims appended hereto.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising,"

"includes," "including," "have," "having" or variants thereof when used herein, specify the presence of stated features, steps, operations, elements, and/or components, but do not preclude the presence or addition of one or more other features, steps, operations, elements, components, and/or groups thereof. Moreover, when an element is referred to as being "responsive" or "connected" to another element or variants thereof, it can be directly responsive or connected to the other element, or intervening elements may be present. In contrast, when an element is referred to as being "directly responsive" or "directly connected" to another element or variants thereof, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Moreover, although some of the diagrams include arrows on communication paths to show a primary direction of communication, it is to be understood that communication may occur in the opposite direction to the depicted arrows.

Various embodiments are described herein with reference to block diagrams and/or flowchart illustrations. It should be noted that in some alternate implementations, the operations noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated and/or blocks may be omitted in some circumstances.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. An Ethernet cable, comprising:
    a first Ethernet cable segment of the Ethernet cable having a first end and a second end and at least eight insulated conductors;
    a second Ethernet cable segment of the Ethernet cable having a first end and a second end and at least eight insulated conductors;
    a third Ethernet cable segment of the Ethernet cable having a first end and a second end and at least eight insulated conductors;
    a housing of the Ethernet cable that receives the respective first ends of the first, second and third Ethernet cable segments;
    a sensor disposed in the Ethernet cable that is configured to determine if a failure has occurred in a two-way communications link through the second Ethernet cable segment; and
    a switching mechanism that is disposed at least partly in the housing of the Ethernet cable, the switching mechanism being configured to selectively connect the at least eight conductors of the first Ethernet cable segment to respective ones of either the at least eight conductors of the second Ethernet cable segment or the at least eight conductors of the third Ethernet cable segment,
    wherein the switching mechanism is configured to automatically break connections between the at least eight conductors of the first Ethernet cable segment and respective ones of the at least eight conductors of the second Ethernet cable and to connect the at least eight conductors of the first Ethernet cable segment to respective ones of the at least eight conductors of the third Ethernet cable segment in response to the sensor determining that the failure has occurred in the two-way communications link through the second Ethernet cable segment.

2. The Ethernet cable of claim 1, wherein the sensor is configured to sense an absence of a physical layer link signal.

3. The Ethernet cable of claim 1, further comprising a printed circuit board that includes at least twenty-four wire connection terminals that receive respective ones of the at least eight insulated conductors of the first, second and third Ethernet cable segments.

4. The Ethernet cable of claim 3, wherein the printed circuit board comprises a flexible printed circuit board.

5. The Ethernet cable of claim 4, wherein the flexible printed circuit board is at least partially rolled into a generally cylindrical shape.

6. The Ethernet cable of claim 5, wherein the housing holds the at least eight insulated conductors of the first, second and third Ethernet cable segments against their respective wire connection terminals.

7. The Ethernet cable of claim 3, wherein the printed circuit board includes at least eight semiconductor switches, wherein each switch is configured to selectively connect a respective one of the at least eight insulated conductors of the first Ethernet cable segment to a respective one of the at least eight conductors of the second Ethernet cable segment or to a respective one of the at least eight conductors of the third Ethernet cable segment.

8. The Ethernet cable of claim 3, wherein at least one component on the printed circuit board is powered via an electrical signal transmitted over one or more of the at least eight conductors of the first Ethernet cable segment.

9. The Ethernet cable of claim 1, wherein the switching mechanism comprises a mechanical switch.

10. A method of selectively coupling a host device connector port to a first connector port on a first network switch and a second connector port on a second network switch, the method comprising:
    transmitting data, by an Ethernet cable apparatus, from the host device to the first connector port on the first network switch, wherein the Ethernet cable apparatus is coupled to the host device and the first connector port;

automatically sensing, by the Ethernet cable apparatus, that a link between the host device connector port and the first connector port on the first network switch has been disrupted; and automatically activating, by the Ethernet cable apparatus, a switching mechanism of the Ethernet cable apparatus that is disposed between the host device connector port and the first connector port on the first network switch that connects at least four conductive paths of the host device connector port to respective ones of at least four insulated conductors of a first Ethernet cable segment of the Ethernet cable apparatus that is disposed between the switch and the second connector port on the second network switch, wherein the switching mechanism is disposed on a printed circuit board.

11. The method of claim 10, wherein the host device connector port, the first connector port on the first network switch and the second connector port on the second network switch each comprise RJ-45 connector ports.

12. The method of claim 10, wherein the first Ethernet cable segment includes eight insulated conductors, and wherein the switching mechanism includes first through eighth wire connection terminals that receive the respective eight insulated conductors of the first Ethernet cable segment as well as ninth through sixteenth wire connection terminals that receive the respective eight insulated conductors of a second Ethernet cable segment and seventeenth through twenty-fourth wire connection terminals that receive the respective eight insulated conductors of a third Ethernet cable segment.

13. The method of claim 10, wherein the switching mechanism is embedded in a plug-jack connector that includes an RJ-45 plug and two RJ-45 jacks, wherein the RJ-45 plug is selectively connected to one of the two RJ-45 jacks by the switching mechanism.

14. The method of claim 10, wherein the switching mechanism is automatically activated in response to sensing an absence of a physical level link signal on an insulated conductor of the Ethernet cable apparatus that connects the host device connector port to the first connector port on the first network switch.

15. A plug-lack connector, comprising:
a housing of the plug-jack connector having a plug end that includes a first plug that is configured to mate with a connector port of an end-device and a jack end that includes a first jack and a second jack, the first jack configured to receive a plug of a first patch cord and the second jack configured to receive a plug of a second patch cord; and
a switching mechanism of the plug-jack connector that selectively connects at least four plug blades of the first plug to corresponding contacts of the first jack or to corresponding contacts of the second jack in response to at least one switching control signal, wherein the switching mechanism is implemented on a printed circuit board,
wherein the at least one switching control signal is generated by a sensing circuit that is mounted within the housing.

16. The plug-jack connector of claim 15, wherein the first plug comprises an RJ-45 plug, and wherein the first and second jacks each comprise RJ-45 jacks.

17. An Ethernet cable, comprising:
a first Ethernet cable segment having a first end and a second end and at least four insulated conductors;
a second Ethernet cable segment having a first end and a second end and at least four insulated conductors;
a third Ethernet cable segment having a first end and a second end and at least four insulated conductors;
a housing of the Ethernet cable that receives the respective first ends of the first, second and third Ethernet cable segments; and
a switching mechanism of the Ethernet cable that is disposed at least partly in the housing of the Ethernet cable, the switching mechanism being configured to selectively connect the at least four conductors of the first Ethernet cable segment to respective ones of either the at least four conductors of the second Ethernet cable segment or the at least four conductors of the third Ethernet cable segment, wherein the switching mechanism is implemented on a printed circuit board,
a sensor disposed at least partly in the housing of the Ethernet cable segment, the sensor being configured to determine if a failure has occurred in a communications link through the second Ethernet cable segment.

18. The Ethernet cable of claim 17, wherein the switching mechanism is configured to automatically break connections between the at least four conductors of the first Ethernet cable segment and respective ones of the at least four conductors of the second Ethernet cable and to connect the at least four conductors of the first Ethernet cable segment to respective ones of the at least four conductors of the third Ethernet cable segment in response to the sensor determining that the failure has occurred in a two-way communications link through the second Ethernet cable segment.

19. The Ethernet cable of claim 17, wherein the switching mechanism includes a control signal input circuit that is configured to electrically connect the at least four conductors of the first Ethernet cable segment to respective ones of the at least four conductors of the third Ethernet cable segment and to disconnect the at least four conductors of the first Ethernet cable segment from respective ones of the at least four conductors of the second Ethernet cable segment in response to a control signal that is received at the control signal input circuit.

20. The Ethernet cable of claim 17, wherein each of the first, second and third Ethernet cable segments includes at least eight insulated conductors, wherein the printed circuit board that includes at least twenty-four wire connection terminals that receive respective ones of the at least eight insulated conductors of the first, second and third Ethernet cable segments.

21. The Ethernet cable of claim 20, wherein the printed circuit board includes at least eight semiconductor switches, wherein each switch is configured to selectively connect a respective one of the at least eight insulated conductors of the first Ethernet cable segment to a respective one of the at least eight insulated conductors of the second Ethernet cable segment or to a respective one of the at least eight insulated conductors of the third Ethernet cable segment.

* * * * *